(12) United States Patent
Howard et al.

(10) Patent No.: US 11,595,444 B2
(45) Date of Patent: Feb. 28, 2023

(54) AUTHENTICITY ASSESSMENT OF A REQUESTOR BASED ON A COMMUNICATION REQUEST

(71) Applicant: INTERNATIONAL BUSINESS MACHINES CORPORATION, Armonk, NY (US)

(72) Inventors: Gina Renee Howard, Hillsborough, NC (US); Charles Steven Lingafelt, Durham, NC (US); John E. Moore, Jr., Pflugerville, TX (US); Andrew R. Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 17/110,554

(22) Filed: Dec. 3, 2020

(65) Prior Publication Data
US 2022/0182414 A1 Jun. 9, 2022

(51) Int. Cl.
*H04L 9/40* (2022.01)
*H04L 67/143* (2022.01)
*H04L 67/141* (2022.01)

(52) U.S. Cl.
CPC .............. *H04L 63/20* (2013.01); *H04L 63/08* (2013.01); *H04L 67/141* (2013.01); *H04L 67/143* (2013.01)

(58) Field of Classification Search
CPC ......... G06F 9/445; H04L 63/08; H04L 63/20; H04L 67/10; H04L 67/141; H04L 67/143; H04L 67/535
See application file for complete search history.

(56) References Cited

U.S. PATENT DOCUMENTS 5,204,961 A 4/1993 Barlow
5,638,494 A 6/1997 Pinard
(Continued)

FOREIGN PATENT DOCUMENTS

| CN | 101110762 A | 1/2008 |
| WO | 2018013925 A1 | 1/2018 |
| WO | 2022118142 A1 | 6/2022 |

OTHER PUBLICATIONS

International Searching Authority, "Notification of Transmittal of the international Search Report and the Written Opinion of the International Searching Authority, or Declaration," Patent Cooperation Treaty, dated Mar. 2, 2022, 7 pages, International Application No. PCT/IB2021/060904.

(Continued)

*Primary Examiner* — Gil H. Lee
(74) *Attorney, Agent, or Firm* — Steven M. Bouknight (57) ABSTRACT

A method for dynamically establishing a communication path for a requestor by assessing an authenticity of the requestor and a communication request is provided. The method may include, in response to receiving the communication request, dynamically determining whether to establish a communication path for the requestor to a destination though a communication network by assessing the requestor based on one or more authentication rules, wherein the one or more authentication rules are based on first information associated the communication network, second information about the requestor, and third information from the requestor. The method may further include, in response to determining that the requestor satisfies the one or more authentication rules, dynamically establishing the communication path for the requestor on the communication network according to one or more communication attributes associated with the requestor.

20 Claims, 5 Drawing Sheets

(56) References Cited

U.S. PATENT DOCUMENTS

| | | | |
|---|---|---|---|
| 6,104,868 A | 8/2000 | Peters | |
| 7,640,546 B2 | 12/2009 | Zarenin | |
| 8,982,727 B2 | 3/2015 | Chou | |
| 9,537,731 B2 | 1/2017 | Link | |
| 10,171,504 B2 | 1/2019 | Wong | |
| 10,225,157 B2 | 3/2019 | Cordray | |
| 10,225,406 B1* | 3/2019 | Avital | G06Q 30/0273 |
| 10,270,692 B1* | 4/2019 | Panda | H04L 67/146 |
| 2003/0074580 A1 | 4/2003 | Knouse | |
| 2006/0015714 A1* | 1/2006 | Hirano | H04L 63/08 |
| | | | 713/151 |
| 2008/0184344 A1* | 7/2008 | Hernacki | G06F 21/31 |
| | | | 726/4 |
| 2008/0189776 A1 | 8/2008 | Constable | |
| 2020/0252380 A1* | 8/2020 | Sathe | H04W 12/0431 |

OTHER PUBLICATIONS

Mavromatis, et al. "A Software Defined Device Provisioning Framework Facilitating Scalability in Internet of Things," 2018 IEEE 5G World Forum (5GWF), Jul. 9-11, 2018 [accessed on Jul. 29, 2020], pp. 446-451, Silicon Valley, CA, USA, DOI: 10.1109/5GWF.2018.8516955, Retrieved from the Internet. <URL: https://ieeexplore.ieee.org/document/8516955>.

Mell et al., "The NIST Definition of Cloud Computing", National Institute of Standards and Technology, U.S. Department of Commerce, Special Publication 800-145, Sep. 2011, pp. 1-7.

* cited by examiner

AUTHENTICITY ASSESSMENT OF A REQUESTOR BASED ON A COMMUNICATION REQUEST

BACKGROUND

The present invention relates generally to the field of computing, and more specifically, to computer security.

Generally, computer security, cybersecurity, or information technology security (IT security) may include the protection of computer systems and networks from the disruption or misdirection of services and applications running on computers. The field of computer security is becoming more important due to increased reliance on computer systems, the Internet, wireless network standards, and due to the growth of smart devices, including smartphones and apps. In computing, a firewall is one of the primary methods for controlling traffic over a network. More specifically, a firewall is a network security system that monitors and controls incoming and outgoing network traffic based on predetermined security rules. Another method for computer protection may include endpoint authentication which is an authentication mechanism used to verify the identity of a network's external or remote connecting device. For example, wireless networks based on endpoint authentication verify user credentials, such as a service set identifier (SSID) and password, as well as security protocols used by the endpoint device.

SUMMARY

A method for dynamically establishing a communication path for a requestor by assessing an authenticity of the requestor and a communication request is provided. The method may include, in response to receiving the communication request, dynamically determining whether to establish a communication path for the requestor to a destination though a communication network by assessing the requestor based on one or more authentication rules, wherein the one or more authentication rules are based on first information associated the communication network, second information about the requestor, and third information from the requestor. The method may further include, in response to determining that the requestor satisfies the one or more authentication rules, dynamically establishing the communication path for the requestor on the communication network according to one or more communication attributes associated with the requestor.

A computer system for dynamically establishing a communication path for a requestor by assessing an authenticity of the requestor and a communication request is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to receiving the communication request, dynamically determining whether to establish a communication path for the requestor to a destination though a communication network by assessing the requestor based on one or more authentication rules, wherein the one or more authentication rules are based on first information associated the communication network, second information about the requestor, and third information from the requestor. The method may further include, in response to determining that the requestor satisfies the one or more authentication rules, dynamically establishing the communication path for the requestor on the communication network according to one or more communication attributes associated with the requestor.

A computer program product for dynamically establishing a communication path for a requestor by assessing an authenticity of the requestor and a communication request is provided. The computer program product may include one or more computer-readable storage devices and program instructions stored on at least one of the one or more tangible storage devices, the program instructions executable by a processor. The computer program product may include program instructions to, in response to receiving the communication request, dynamically determining whether to establish a communication path for the requestor to a destination though a communication network by assessing the requestor based on one or more authentication rules, wherein the one or more authentication rules are based on first information associated the communication network, second information about the requestor, and third information from the requestor. The computer program product may further include program instructions to, in response to determining that the requestor satisfies the one or more authentication rules, dynamically establishing the communication path for the requestor on the communication network according to one or more communication attributes associated with the requestor.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, embodiments of the present invention relate generally to the field of computing, and more particularly, to computer and network security. Specifically, the following described exemplary embodiments provide a system, method and program product for improving the generation of network flows based upon application requests and measuring an authenticity of the requests. More specifically, the present invention has the capacity to improve the technical field associated with computer and network security by assessing a strength of authenticity of a requestor and a validity of a request based on rules which may determine if a network is subsequently modified for a requested action. For example, the present invention may include communication controller that may interpret rules for assessing the strength of the authenticity of a requestor and the validity the requested network actions. The communications controller may also maintain awareness of pre-approved applications and their associated pre-defined network attributes. The communication controller uses this information to evaluate communication requests and enable only those which are allowable according to a pre-defined policy, based on a strength of authenticity of the requestor of the requested connection and appropriateness of the request. In turn, network configuration changes may be sent to the network, such as a software-defined network (SDN), to enable the allowable traffic and then disable the traffic when communication is no longer needed.

Specifically, and as previously described with respect to computer security, firewalls and endpoint authentication are two popular methods for controlling connections and traffic over a network. However, firewalls frequently require a significant amount of time to determine the complex set of addresses, ports and protocols which will be permitted or blocked, potentially delaying important business workflows. Also, once desired access controls are defined for the firewall, a change window may normally be required during which many network devices must be updated manually to implement the desired controls. This is both time consuming and error prone due to the manual nature of the configuration process. Furthermore, access controls frequently remain in effect long after an application or system for which the access controls were originally implemented have been retired. This creates a potential security exposure wherein the permitted ports and protocols could be used for malware or other undesirable traffic.

With the advent of software defined networks (SDN), network devices can be reconfigured programmatically and quickly, thereby reducing both the time required to implement changes and the potential for human error. Currently, the reconfiguration process is a centralized approach, with the all-knowing network provider directing the creation/ deletion of allowable network flows. Furthermore, a network provider may install firewalls within the network to control flows, and with the software defined network, the network provider could control flows by causing the network to generate a dynamic route that is under the control of the network provider or create firewall instance specifically for the purpose of supporting appropriate flows and flow control. However, a root cause for why hackers were successful in the past was the lack of device authentication methods to validate computer device. This root cause drove the creation of endpoint authentication and protocols such as SFTP and HTTPS where the device must prove its identity as part of establishing a connection. However, SDNs are undergoing a conceptual transition from route creation by an all-knowing service provider to route creation on demand by a requestor, such as computer device or application on the network. This is enabled by an SDN system providing application programming interface (API) access through which a device may command the SDN to create/remove/alter a route through the network. Furthermore, while endpoint/device authentication may be used to authenticate a device, a requestor may not include just the computer device but may also include an application running on the device or a micro service associated with a device and/or application. Accordingly, it may not be possible for an all-knowing network provider to be aware of every possible device, application or micro-service. Similarly, applications have become temporary containers which are created as needed and then destroyed, and during the life of the application it will require network flows.

Thus, to avoid massive security failures, the network must have methods to assess the authenticity of a requesting device in the context of an SDN and with the reality that endpoint devices, in general, may not be altered to actively participate in proving their authenticity (i.e. the device must prove concept). Furthermore, any such solution to this problem must operate without modification of existing requestors or modification to any existing network protocols as the installed base of requestors may be enormous and the cost to modify the interactions with the network and requestors may be insurmountable. As such, it may be advantageous, among other things, to provide a method, computer system, and computer program product for dynamically (i.e. automatically, in real-time) establishing a communication path for a communication request by assessing a strength of authenticity of a requestor and a validity of a request based on rules which may determine if a network is subsequently modified to allow a requested action.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
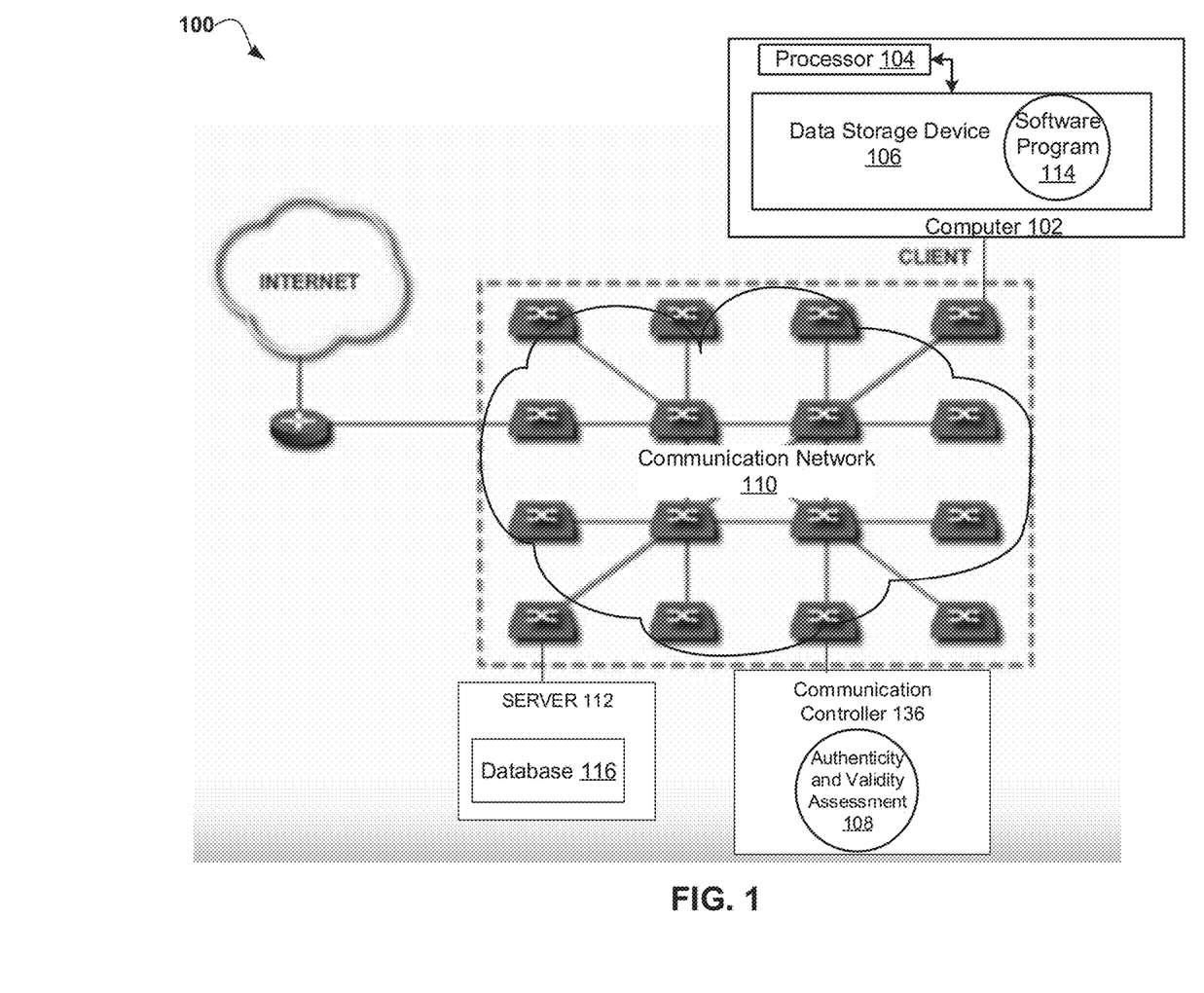
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a software program 114, and may also include a microphone (not shown). The software program 114 may be an application program such as an internet application and/or one or more apps running on a client computer 102, such as a desktop, laptop, tablet, and mobile phone device. The authenticity and validity assessment program 108 may communicate with the software program 114. The networked computer environment 100 may also include a server 112 and a communication network 110. The networked computer environment 100 may include a plurality of computers 102 and servers 112, only one of which is shown for illustrative brevity. For example, the plurality of computers 102 may include a plurality of interconnected devices, such as the mobile phone, tablet, and laptop, associated with one or more users.

According to at least one implementation, the present embodiment may also include a database 116, which may be running on server 112. The communication network 110 may include various types of communication networks, such as a software-defined network (SDN), wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wired, wireless communication links, or fiber optic cables. As will be discussed with reference to FIG. 3, server computer 112 may include internal components 1102a and external components 1104a, respectively, and client computer 102 may include internal components 1102b and external components 1104b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network.

The networked computer environment 100 may also include a communication controller 136 that is enabled to run an authenticity and validity assessment program 108. According to various implementations of the present embodiment, the communication controller 136 may include one or more servers and/or other computing devices, and/or may be embedded in the communication network 110 or in various storage devices, such as, but not limited to, a networked server 112, or a cloud storage service. The communication controller 136 may interact with the communication network 110 and may be configured by the authenticity and validity assessment program 108 to dynamically evaluate communication requests by assessing a strength of authenticity of a requestor and a validity of a request based on rules which may determine if the communication network 110 is subsequently modified to allow a requested action. Specifically, the authenticity and validity assessment program 108 may configure the communication controller 136 to receive communication requests, determine if and how the request will be honored, and command the communication network 110 to configure the network as needed.

According to one embodiment, a requestor may be any entity, such as an application, a micro service, a software component, a hardware component, and a computing device, which can request the communication network 110 to establish a communication path to a destination. For example, a requestor may include a database application requesting a connection to another database application for purpose of backing up a database, a laptop application requesting to connect to a server application such as an email client where the laptop is requesting communications with an email sever, and/or a micro-service requesting to connect to database, such as a micro-service which is looking up weather information for a specific location.

As will be described in greater detail with respect to FIG. 2, the communication controller 136 and authenticity and validity assessment program 108 may assess a strength of the authenticity of the requestor of a network route based on one or more or combinations of authenticity assertions that may include authenticity assertions based on information from the communication network 110, authenticity assertions based on information about the requestor, authenticity assertions based on information from the requestor, and authenticity assertions based on information about a network operator/owner. For example, during a setup phase, the communication controller 136 may be configured by the authenticity and validity assessment program 108 to establish what requestors will be allowed to communicate on the communication network 110 and to the communications controller 136, establish required/preferred communication attributes for certain types of communications and/or specific communications, establish a strength of authentication required of the requestor (or categories of requestors) to validate the authenticity of the requestor, and establish evaluation rules for evaluating an appropriateness of a request (such as determining a threshold number of authenticity assertions that a requestor is required to meet before establishing a communication path for the requestor).

According to one embodiment, communication attributes may include required or preferred characteristics of the communication path such as, but not limited to, physical routing of communication path through specific physical locations or regions or countries; requirement for maximum or minimum route latency, requirement for high availability route, requirement for route which can accommodate a minimum packet size, requirement for route to provide minimum or maximum throughput, requirement that route exist only during certain times of day, days of week, requirement that the route must be encrypted and its encryption strength, requirement for minimum and maximum duration of the route. Also, according to one embodiment, physical network connection information may include attributes about the physical connection which the requestor is using to connect itself to the communication network 110. This information may include the physical link identity, the type and characteristics of the physical link (i.e., 10 Gigabit link rate, Ethernet, Wired, Fiber), the switch port identity, the physical location of the link (i.e., the real-time transport protocol (RTP) campus, the state of North Carolina, the country of the United States). Furthermore, according to one embodiment, logical network connection information may include attributes about the logical connection which the requestor is using to connect itself to the communication network 110. This may include the IP address, the IP subnet, the VLAN ID, the default router IP address, the provider of the network stack Referring now to FIG. 2, an operational flowchart 200 illustrating the steps carried out by the authenticity and validity assessment program 108 for dynamically evaluating and processing communication requests by assessing a strength of authenticity of a requestor and a validity of a request based on rules which may determine whether to subsequently modify the communication network 110 to allow a requested action is depicted. Specifically, with respect to FIG. 3 at 202, and as previously described, the communication controller 136 and authenticity and validity assessment program 108 may receive a communication request from a requestor. As previously described, a requestor may be any entity which can request the communication network 110 to establish a communication path to a destination. For example, a requestor may include a database application requesting a connection to another database application, a laptop application running on client computer 102 requesting to connect to a server application running on server 112, and/or a micro-service requesting to connect to a database 116. According to one embodiment, the requestor may signal the communication controller 136 or the communication network 110 (which may convey the communication request to the communication controller 136). For example, the communication network 110 may have received a domain name system (DNS) resolution query from a requestor and may inform the communication controller 136 of the DNS query. For those skilled in the art, there may be multiple methods to identify a communication request, therefore, the aforementioned methods should not be viewed as limiting.

Then, at 204, in response to receiving the communication request, the communication controller 136 may use the authenticity and validity assessment program 108 to perform an authenticity assessment of the requestor and the communication request. Specifically, the authenticity and validity assessment program 108 may perform the authenticity assessment based on a set of authentication rules (i.e. authenticity assertions) that govern whether a connection should be established between the requestor and a desired server/database in order to process the required action in the communication request. More specifically, for example, and as previously described, the authenticity and validity assessment program 108 may perform the authenticity assessment based on the requestor and the received request satisfying one or more or combinations of authenticity assertions that may include authenticity assertions based on information from the communication network 110, authenticity assertions based on information about the requestor, authenticity assertions based on information from the requestor, and authenticity assertions based on information about a network operator/owner.

For example, for authenticity assertions based on information from the communication network 110, the authenticity and validity assessment program 108 may cause the communication controller 136 to query the communication network 110 for the requestor's physical network attributes, query the communication network 110 for the requestor's logical network connection information, and/or query the communication network 110 for the requestor's connection history. Also, for example, for authenticity assertions based on information about the requestor, the authenticity and validity assessment program 108 may cause the communication controller 136 to scan the requestor for observable attributes such as open ports and/or a version/level of an operating system (OS) associated with the requestor, cause the communication controller 136 to fingerprint the requestor, and/or cause the communication controller 136 to query an identity authority which provides assurance of the authenticity of the requestor. Also, for example, for authenticity assertions based on information from the requestor, the authenticity and validity assessment program 108 may cause the communication controller 136 to receive from the requestor, as part of the request, the requestor's identity credentials, or queries and receives from the requestor the requestor's identity credentials. Furthermore, for example, for authenticity assertions based on information about a network operator/owner, the authenticity and validity assessment program 108 may cause the communication controller 136 to query the network operator for allowable connectivity configurations. The determination of whether the authenticity assessment is true (i.e. satisfied) can be based on whether a single authenticity assertion is true, or some combination of different authenticity assertions, or a measure of weighted authenticity assertions in which an aggregation of the weights exceeds a threshold. Therefore, there may be many techniques for combining the various possible authenticity assertions based on configuration.

For example, the communication controller 136 may receive a DNS query from an application 114 running on client computer 102, whereby the DNS query may be fora request to execute of a micro service that is requesting weather information in New York City. Thus, the DNS query may be interpreted as a request to establish a temporary connection between the requestor (i.e. the application) and a database 116 that holds weather information associated with New York City so that the requestor may query the database 116. As such, the authenticity and validity assessment program 108 may perform an authenticity assessment of the requestor and the communication request to determine whether the requestor (i.e. the application) is authentic and/or trusted in order to establish the communication pathway on the communication network 110 between the requestor and the database 116. Accordingly, based on the authenticity assertions described above, the authenticity and validity assessment program 108 may identify the physical location of the application making the request to determine whether the physical location is a trusted site and/or device, may determine whether the application's logical connection is correct such as determining that an IP address of the application is understood, and/or may determine based on connection history that the application has made a similar connection to the database 116 in the past 16 days. As such, based on satisfaction of one or more combinations of these authenticity assertions, and/or based on satisfaction of a more weighted authenticity assertion, the authenticity and validity assessment program 108 may determine whether to dynamically establish a communication path through the communication network 110 to allow the requestor application to connect to the database 116.

In turn, at 206, in response to determining that the communication request is appropriate, or more specifically, that the requestor satisfies a required number of authenticity assertions, the authenticity and validity assessment program 108 may cause the communication controller 136 to command the communication network 110 to establish a communication path (i.e. network connectivity) as defined by required communication attributes. As previously, described the communication attributes may include required or preferred characteristics of the communication path such as, but not limited to, physical routing of communication path through specific physical locations or regions or countries; requirement for maximum or minimum route latency, requirement for high availability route, requirement for route which can accommodate a minimum packet size, requirement that route exist only during certain time period, requirement that the route must be encrypted and its encryption strength, and/or requirement for minimum and maximum duration of the route. Therefore, and continuing from the previous example, based on satisfaction of one or more combinations of the described authenticity assertions, the authenticity and validity assessment program 108 may dynamically establish a communication path through the communication network 110 to allow the requestor application to connect to the database 116 containing weather information for New York City. Furthermore at 208, the authenticity and validity assessment program 108 may cause the communication controller 136 to automatically terminate network connectivity (i.e. the established communication path) for the requestor based on communication attributes when the communication path is no longer needed for the requestor and the communication request.

Figure 2:
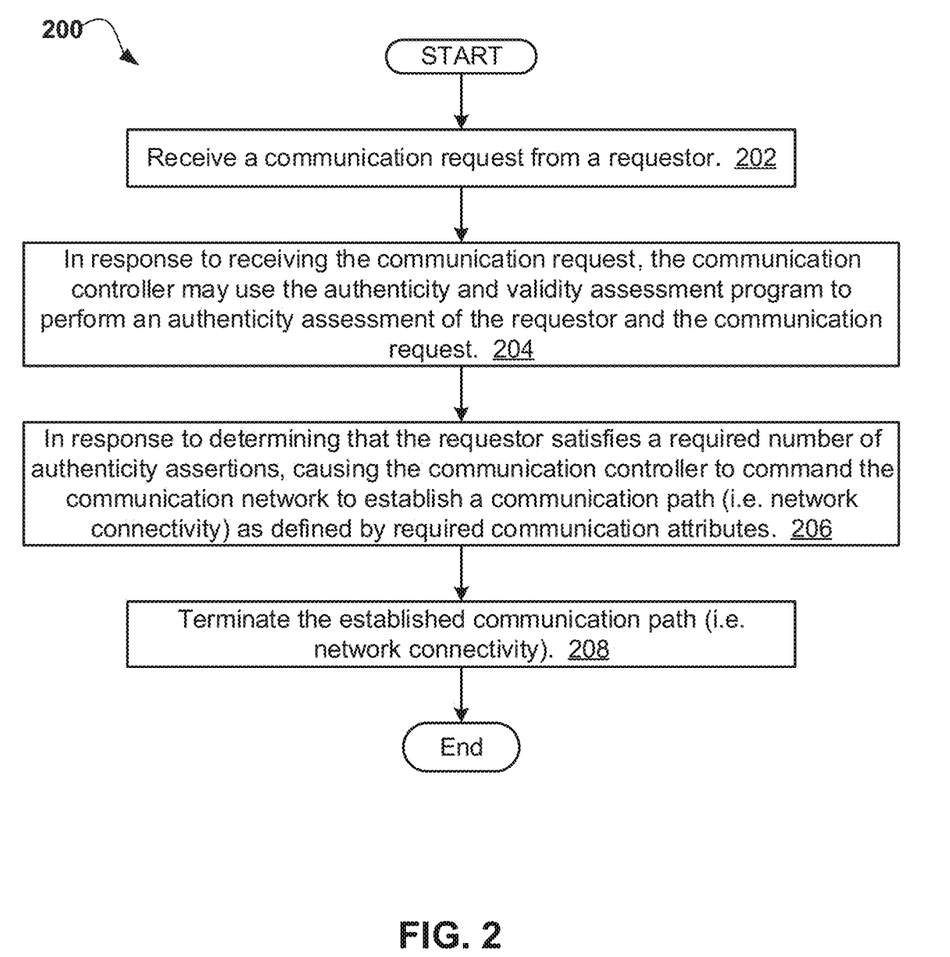
FIG. 2 is an operational flowchart illustrating the steps carried out by a program for dynamically establishing a communication path for a requestor by assessing an authenticity of the requestor and a communication request according to one embodiment.

It may be appreciated that FIGS. 1-2 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
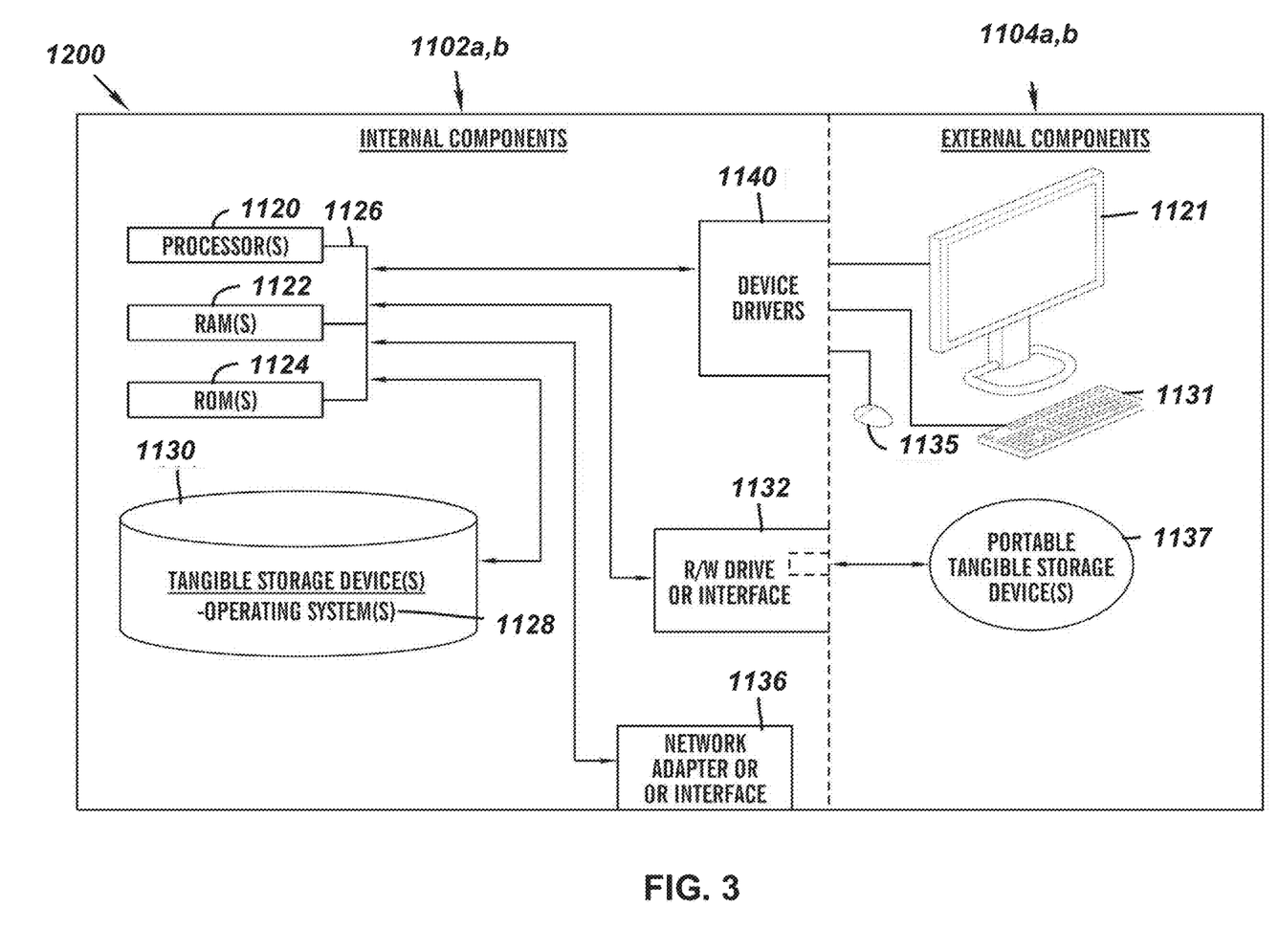
FIG. 3 is a block diagram of the system architecture of the program for dynamically establishing a communication path for a requestor by assessing an authenticity of the requestor and a communication request according to one embodiment.

FIG. 3 is a block diagram 1100 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 110, 1104 is representative of any electronic device capable of executing machine-readable program instructions. Data processing system 1102, 1104 may be representative of a smart phone, a computer system, PDA, or other electronic devices. Examples of computing systems, environments, and/or configurations that may be represented by data processing system 1102, 1104 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), communication controller 136 (FIG. 1), and network server 112 (FIG. 1) include respective sets of internal components 1102 a, b and external components 1104 a, b illustrated in FIG. 3. Each of the sets of internal components 1102 a, b includes one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 114 (FIG. 1) in client computer 102 (FIG. 1) and the authenticity and validity assessment program 108 (FIG. 1) in communication controller 136 (FIG. 1) are stored on one or more of the respective computer-readable tangible storage devices 1130 for execution by one or more of the respective processors 1120 via one or more of the respective RAMs 1122 (which typically include cache memory). In the embodiment illustrated in FIG. 3, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 a, b, also includes a R/W drive or interface 1132 to read from and write to one or more portable computer-readable tangible storage devices 1137 such as a CD-ROM, DVD, memory stick, magnetic tape, magnetic disk, optical disk or semiconductor storage device. A software program, such as an authenticity and validity assessment program 108 (FIG. 1), can be stored on one or more of the respective portable computer-readable tangible storage devices 1137, read via the respective R/W drive or interface 1132, and loaded into the respective hard drive 1130.

Each set of internal components 1102 a, b also includes network adapters or interfaces 1136 such as a TCP/IP adapter cards, wireless Wi-Fi interface cards, or 3G or 4G wireless interface cards or other wired or wireless communication links. The authenticity and validity assessment program 108 (FIG. 1) and software program 114 (FIG. 1) can be downloaded to client computer 102 (FIG. 1) and network server 112 (FIG. 1) from an external computer via a network (for example, the Internet, a local area network or other, wide area network) and respective network adapters or interfaces 1136. From the network adapters or interfaces 1136, the software program 114 (FIG. 1) in client computer 102 (FIG. 1) and the authenticity and validity assessment program 108 (FIG. 1) in communication controller 136 (FIG. 1) are loaded into the respective hard drive 1130. The network may comprise copper wires, optical fibers, wireless transmission, routers, firewalls, switches, gateway computers, and/or edge servers.

Each of the sets of external components 1104 a, b can include a computer display monitor 1121, a keyboard 1131, and a computer mouse 1135. External components 1104 a, b can also include touch screens, virtual keyboards, touch pads, pointing devices, and other human interface devices. Each of the sets of internal components 1102 a, b also includes device drivers 1140 to interface to computer display monitor 1121, keyboard 1131, and computer mouse 1135. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
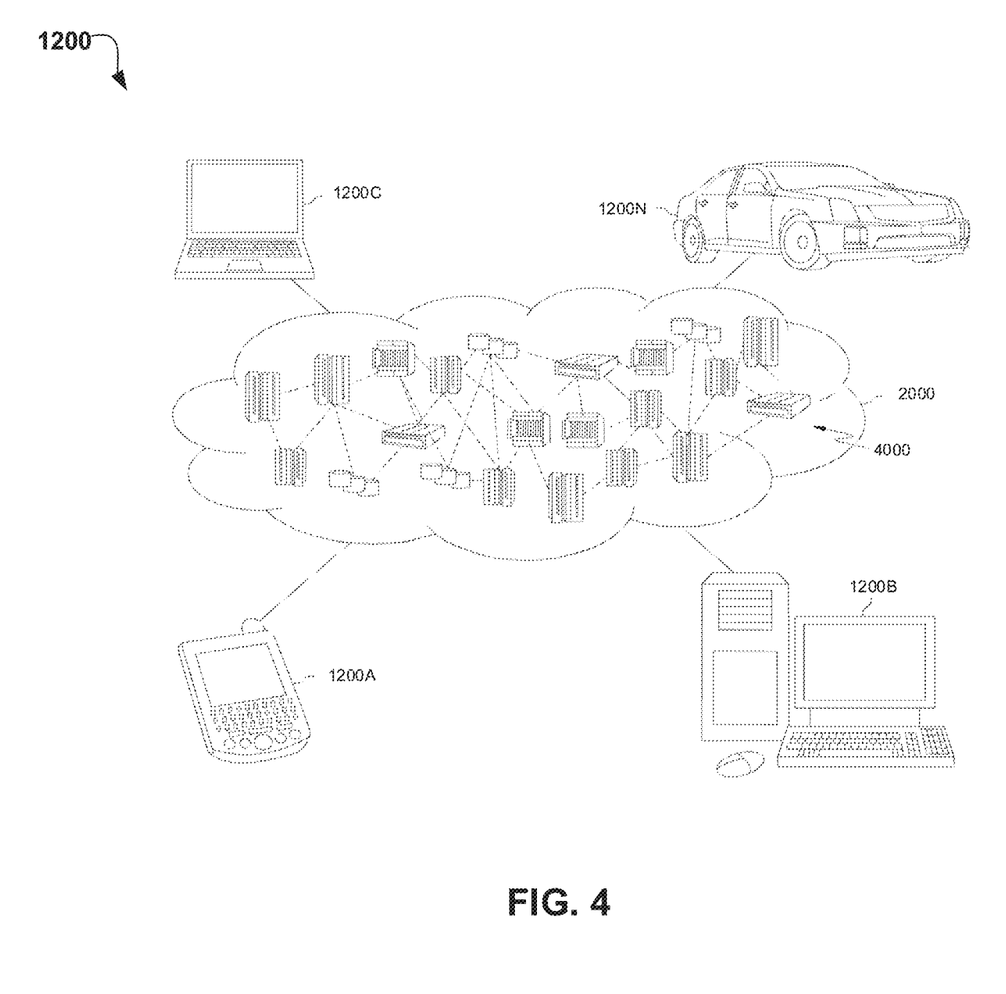
FIG. 4 is a block diagram of an illustrative cloud computing environment including the computer system depicted in FIG. 1, in accordance with an embodiment of the present disclosure.

Referring now to FIG. 4, illustrative cloud computing environment 1200 is depicted. As shown, cloud computing environment 1200 comprises one or more cloud computing nodes 4000 with which local computing devices used by cloud consumers, such as, for example, personal digital assistant (PDA) or cellular telephone 1200A, desktop computer 1200B, laptop computer 1200C, and/or automobile computer system 1200N may communicate. Nodes 4000 may communicate with one another. They may be grouped (not shown) physically or virtually, in one or more networks, such as Private, Community, Public, or Hybrid clouds as described hereinabove, or a combination thereof. This allows cloud computing environment 2000 to offer infrastructure, platforms and/or software as services for which a cloud consumer does not need to maintain resources on a local computing device. It is understood that the types of computing devices 1200A-N shown in FIG. 8 are intended to be illustrative only and that computing nodes 4000 and cloud computing environment 2000 can communicate with any type of computerized device over any type of network and/or network addressable connection (e.g., using a web browser).

Figure 5:
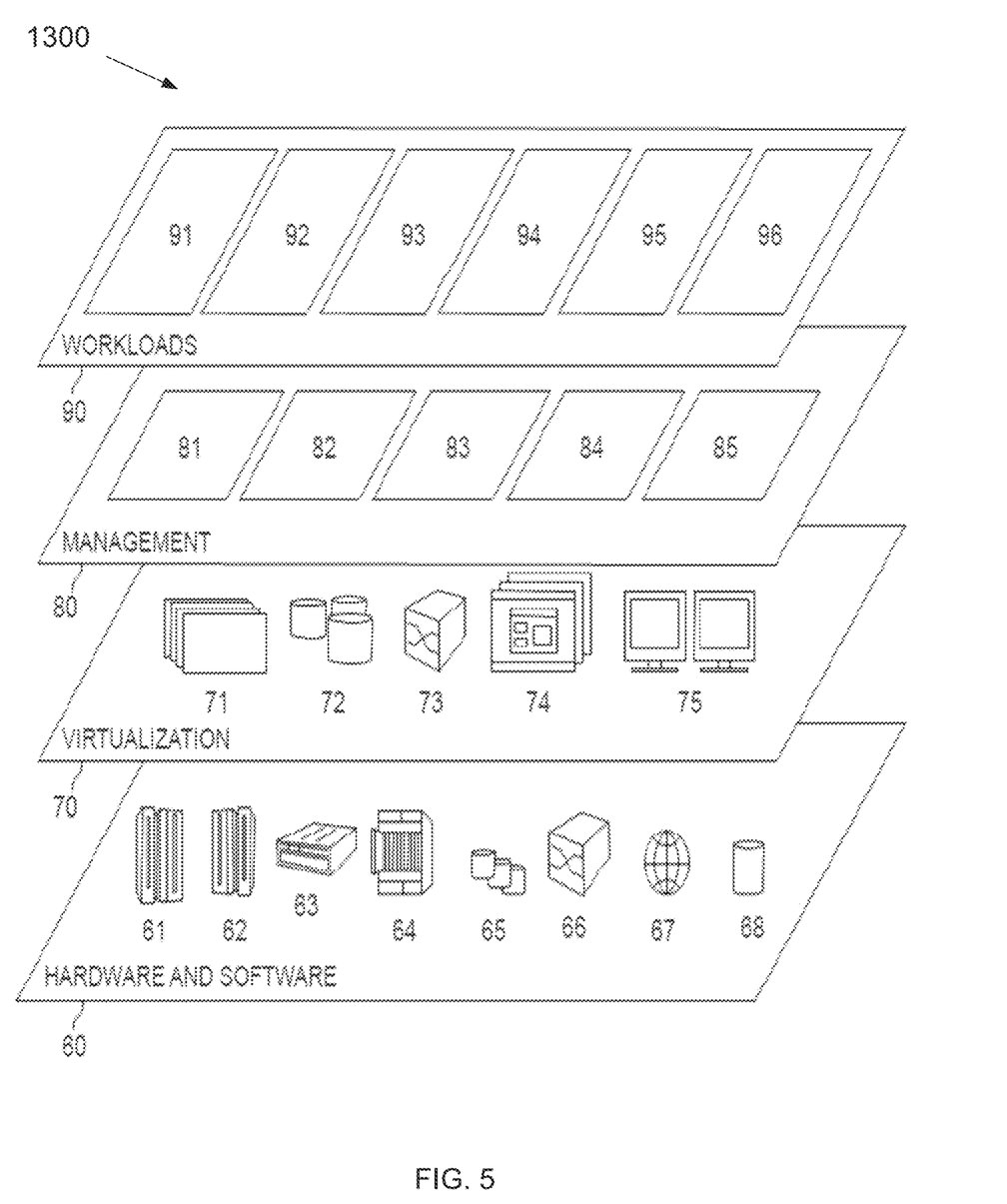
FIG. 5 is a block diagram of functional layers of the illustrative cloud computing environment of FIG. 4, in accordance with an embodiment of the present disclosure.

Referring now to FIG. 5, a set of functional abstraction layers 1300 provided by cloud computing environment 1200 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authenticity and validity assessment 96. An authenticity and validity assessment program 108 (FIG. 1) may be offered "as a service in the cloud" (i.e., Software as a Service (SaaS)) and may dynamically establish a communication path for a communication request by assessing a strength of authenticity of a requestor and a validity of a request based on rules which may determine whether a communication network is subsequently modified to allow the requested action.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for establishing a communication path for a requestor by assessing an authenticity of the requestor and a communication request, the method comprising:

in response to receiving the communication request, determining whether to establish the communication path for the requestor to a destination through a communication network by assessing the requestor based on one or more authentication rules, wherein the one or more authentication rules are based on first information associated with the communication network, second information about the requestor, and third information from the requestor, wherein the first information associated with the communication network comprises one or more physical network attributes, logical network connection information, and connection history information associated with the requestor; and in response to determining that the requestor satisfies the one or more authentication rules, establishing the communication path for the requestor on the communication network according to one or more communication attributes associated with the requestor.

2. The method of claim 1, wherein the requestor is selected from a group comprising at least one of an application, a micro service, a software component, a hardware component, and a computing device.

3. The method of claim 1, further comprising:
wherein the one or more authentication rules are based on fourth information about allowable connectivity provided by a network operator, and wherein assessing the requestor based on the fourth information from the network operator comprises:
querying the network operator for allowable connectivity configurations.

4. The method of claim 1, wherein assessing the requestor based on first information associated the communication network further comprises:
determining the one or more physical network attributes associated with the requestor;
determining the logical network connection information associated with the requestor; and
determining the connection history information associated with the requestor.

5. The method of claim 1, wherein assessing the requestor based on second information about the requestor further comprises:
scanning the requestor for observable attributes including open ports and a version of an operating system associated with the requestor; and
obtaining from an inventory or database, information about the requestor.

6. The method of claim 1, wherein assessing the requestor based on third information from the requestor further comprises:
querying the requestor to receive information and identity credentials associated with the requestor.

7. The method of claim 1, further comprising:
automatically terminating the established communication path in response to determining the communication path for the requestor is no longer needed.

8. A computer system for establishing a communication path for a requestor by assessing an authenticity of the requestor and a communication request, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

in response to receiving the communication request, determining whether to establish the communication path for the requestor to a destination through a communication network by assessing the requestor based on one or more authentication rules, wherein the one or more authentication rules are based on first information associated with the communication network, second information about the requestor, and third information from the requestor, wherein the first information associated with the communication network comprises one or more physical network attributes, logical network connection information, and connection history information associated with the requestor; and in response to determining that the requestor satisfies the one or more authentication rules, establishing the communication path for the requestor on the communication network according to one or more communication attributes associated with the requestor.

9. The computer system of claim 8, wherein the requestor is selected from a group comprising at least one of an application, a micro service, a software component, a hardware component, and a computing device.

10. The computer system of claim 8, further comprising:
wherein the one or more authentication rules are based on fourth information about allowable connectivity provided by a network operator, and wherein assessing the requestor based on the fourth information from the network operator comprises:
querying the network operator for allowable connectivity configurations.

11. The computer system of claim 8, wherein assessing the requestor based on first information associated the communication network further comprises:
determining the one or more physical network attributes associated with the requestor;
determining the logical network connection information associated with the requestor; and
determining the connection history information associated with the requestor.

12. The computer system of claim 8, wherein assessing the requestor based on second information about the requestor further comprises:
scanning the requestor for observable attributes including open ports and a version of an operating system associated with the requestor; and
obtaining from an inventory or database, information about the requestor.

13. The computer system of claim 8, wherein assessing the requestor based on third information from the requestor further comprises:
querying the requestor to receive identity credentials associated with the requestor.

14. The computer system of claim 8, further comprising:
automatically terminating the established communication path in response to determining the communication path for the requestor is no longer needed.

15. A computer program product for establishing a communication path for a requestor by assessing an authenticity of the requestor and a communication request, comprising:
one or more tangible computer-readable storage devices and program instructions stored on at least one of the one or more tangible computer-readable storage devices, the program instructions executable by a processor, the program instructions comprising:
program instructions to, in response to receiving the communication request, determine whether to establish the communication path for the requestor to a destination through a communication network by assessing the requestor based on one or more authentication rules, wherein the one or more authentication rules are based on first information associated with the communication network, second information about the requestor, and third information from the requestor, wherein the first information associated with the communication network comprises one or more physical network attributes, logical network connection information, and connection history information associated with the requestor; and program instructions to, in response to determining that the requestor satisfies the one or more authentication rules, establish the communication path for the requestor on the communication network according to one or more communication attributes associated with the requestor.

16. The computer program product of claim 15, wherein the requestor is selected from a group comprising at least one of an application, a micro service, a software component, a hardware component, and a computing device.

17. The computer program product of claim 15, further comprising:

wherein the one or more authentication rules are based on fourth information about allowable connectivity provided by a network operator, and wherein assessing the requestor based on the fourth information from the network operator comprises:

querying the network operator for allowable connectivity configurations.

18. The computer program product of claim 15, wherein the program instructions to assess the requestor based on first information associated the communication network further comprises:

program instructions to determine the one or more physical network attributes associated with the requestor;

program instructions to determine the logical network connection information associated with the requestor; and program instructions to determine the connection history information associated with the requestor.

19. The computer program product of claim 15, wherein assessing the requestor based on second information about the requestor further comprises:

program instructions to scan the requestor for observable attributes including open ports and a version of an operating system associated with the requestor; and program instructions to obtain from an inventory or database, information about the requestor.

20. The computer program product of claim 15, wherein the program instructions to assess the requestor based on third information from the requestor further comprises:

program instructions to query the requestor to receive identity credentials associated with the requestor.

* * * * *